United States Patent [19]

Dulko

[11] Patent Number: 5,985,234
[45] Date of Patent: Nov. 16, 1999

[54] POLYALUMINUM CHLORIDES AND POLYALUMINUM CHLOROSULFATES METHODS AND COMPOSITIONS

[75] Inventor: James M. Dulko, Pasadena, Md.

[73] Assignee: Delta Chemical Corporation, Baltimore, Md.

[21] Appl. No.: 08/917,275

[22] Filed: Aug. 25, 1997

Related U.S. Application Data

[63] Continuation of application No. PCT/US96/13977, Aug. 29, 1996.

[60] Provisional application No. 60/015,407, Apr. 15, 1996, and provisional application No. 60/007,084, Sep. 18, 1995.

[51] Int. Cl.⁶ .................................................. C01B 17/46
[52] U.S. Cl. ......................... 423/467; 423/556; 210/723; 210/702
[58] Field of Search .................................... 423/467, 556; 210/702, 716, 723

[56] References Cited

U.S. PATENT DOCUMENTS

| | | | |
|---|---|---|---|
| 1,422,560 | 7/1922 | Gibbs . | |
| 1,430,449 | 9/1922 | Howard . | |
| 1,701,510 | 2/1929 | Sieurin . | |
| 2,256,505 | 9/1941 | Thompson | 167/90 |
| 2,312,198 | 2/1943 | Slagle | 23/50 |
| 2,392,153 | 1/1946 | Kastnig | 23/92 |
| 2,868,623 | 1/1959 | Vittands | 23/98 |
| 2,876,163 | 3/1959 | Garizio et al. | 167/90 |
| 2,947,604 | 8/1960 | Laist | 23/143 |
| 3,113,911 | 12/1963 | Jones | 204/94 |
| 3,270,001 | 8/1966 | Morimoto | 260/124 |
| 3,409,547 | 11/1968 | Dajani | 210/54 |
| 3,476,509 | 11/1969 | Jones | 23/50 |
| 3,497,459 | 2/1970 | Nakamura et al. | 252/317 |
| 3,535,268 | 10/1970 | Hayes | 252/313 |
| 3,544,476 | 12/1970 | Aiba et al. | 252/317 |
| 3,738,945 | 6/1973 | Panzer et al. | 260/2 |
| 3,833,718 | 9/1974 | Reed et al. | 423/629 |
| 3,887,691 | 6/1975 | Kobetz | 423/462 |
| 3,891,745 | 6/1975 | Bellan et al. | 423/462 |
| 3,894,144 | 7/1975 | Becher et al. | 423/467 |
| 3,909,439 | 9/1975 | Rivola et al. | 252/187 |
| 3,929,666 | 12/1975 | Aiba et al. | 252/317 |
| 3,953,330 | 4/1976 | Tonkyn et al. | 210/52 |
| 3,953,584 | 4/1976 | Danner et al. | 423/462 |
| 3,989,805 | 11/1976 | Notari et al. | 423/462 |
| 4,034,067 | 7/1977 | Seigneurin et al. | 423/462 |
| 4,051,028 | 9/1977 | Fiessinger | 210/47 |
| 4,082,685 | 4/1978 | Notari et al. | 252/187 |
| 4,131,545 | 12/1978 | Redmayne et al. | 210/47 |
| 4,238,347 | 12/1980 | Gancy et al. | 252/175 |
| 4,362,643 | 12/1982 | Kuo et al. | 252/175 |
| 4,388,208 | 6/1983 | Gytel | 252/175 |
| 4,390,445 | 6/1983 | Gytel | 252/175 |
| 4,417,996 | 11/1983 | Kuo et al. | 252/175 |
| 4,451,388 | 5/1984 | Payne | 252/313 |
| 4,559,220 | 12/1985 | Kullenberg et al. | 423/556 |
| 4,582,627 | 4/1986 | Carlsson | 252/181 |
| 4,654,201 | 3/1987 | Carlsson | 423/128 |
| 4,655,934 | 4/1987 | Rose et al. | 210/728 |
| 4,826,606 | 5/1989 | Becker et al. | 210/728 |
| 4,859,446 | 8/1989 | Abrutyn et al. | 423/462 |
| 4,877,597 | 10/1989 | Haase et al. | 423/556 |
| 4,882,140 | 11/1989 | Becker | 423/629 |
| 4,944,933 | 7/1990 | Inward | 423/462 |
| 4,981,673 | 1/1991 | Boutin et al. | 423/467 |
| 5,008,095 | 4/1991 | Boutin | 423/467 |
| 5,076,940 | 12/1991 | Boutin et al. | 210/716 |
| 5,120,522 | 6/1992 | Doré et al. | 423/462 |
| 5,124,139 | 6/1992 | Colvin et al. | 423/467 |
| 5,149,400 | 9/1992 | Haase et al. | 162/181.6 |
| 5,182,094 | 1/1993 | Kvant et al. | 423/462 |
| 5,246,686 | 9/1993 | Cuer et al. | 423/467 |
| 5,348,721 | 9/1994 | Murphy et al. | 423/463 |
| 5,518,706 | 5/1996 | Boutin et al. | 423/467 |
| 5,603,912 | 2/1997 | Giovanniello et al. | 423/467 |

FOREIGN PATENT DOCUMENTS

| | | |
|---|---|---|
| 191628 | 8/1986 | European Pat. Off. . |
| 285282 | 10/1988 | European Pat. Off. . |
| 327419 | 8/1989 | European Pat. Off. . |
| 393275 | 10/1990 | European Pat. Off. . |
| 557153 | 8/1993 | European Pat. Off. . |
| 3338624 | 4/1984 | Germany ............... 423/467 |

OTHER PUBLICATIONS

Chem. Abstr. vol. 94, No. 16, abstr. #124,070, Water–Soluble Basic Aluminum Salt Production (abstract of JP 55,140,718) Apr. 20, 1981.

Dialog abstract of EP patent document 557,153 (listed above as document AL1), Derwent World Patents Index accession No. 93–266446/199334. Aug. 1993.

Dialog abstract of EP patent document 327,419 (listed above as document AN1), Derwent World Patents Index accession No. 89–229425/198932. Aug. 1989.

*Primary Examiner*—Ngoc-Yen Nguyen
*Attorney, Agent, or Firm*—Michael A. Sanzo; Vinson & Elkins L.L.P.

[57] ABSTRACT

The present invention is directed to a process for the production of polyaluminum chlorides and polyaluminum chlorosulfates useful as coagulants in water treatment. In addition, the invention is directed to the products made by the disclosed processes.

12 Claims, 8 Drawing Sheets

POLYALUMINUM CHLORIDES AND POLYALUMINUM CHLOROSULFATES METHODS AND COMPOSITIONS

The present application is a continuation of PCT/US96/13977, now WO 97/11029, and claims priority of U.S. provisional applications Ser. No. 60/015,497 filed Apr. 15, 1999 and Ser. No. 60/007,084 filed Sep. 18, 1995.

FIELD OF THE INVENTION

The present invention relates to processes for making polyaluminum chlorides and polyaluminum chlorosulfates. The processes can produce products of a wide range of basicities and which are suitable for use as water purification agents.

BACKGROUND OF THE INVENTION

Polyaluminum chlorides and polyaluminum chlorosulfates are compounds used as flocculents and coagulants for water and wastewater treatment. Compared with other inorganic purification agents, these compounds generally work more efficiently, produce less by-product sludge, work better in cold water, settle faster and reduce the pH of water to a lesser extent. The compounds are also used in the production of paper, antiperspirants, foods and pharmaceuticals.

A number of processes have been designed for producing polyaluminum chlorides and polyaluminum chlorosulfates with characteristics favorable for water treatment. For example, U.S. Pat. No. 5,246,686 discloses a process in which basic aluminum chlorosulfate is reacted with an alkaline-earth metal compound (e.g., calcium carbonate) to produce high basicity polyaluminum chlorosulfates. One drawback of this reaction is that it results in the formation of insoluble alkaline-earth sulfates (e.g., gypsum) which must be removed from product solutions by processes such as filtration or centrifugation. This makes the reaction undesirable in high volume industrial operations. Similar problems involving the formation of precipitates have been encountered in processes involving the reaction of aluminum sulfate with a slurry of calcium carbonate and calcium chloride (see e.g., U.S. Pat. No. 4,981,673 or U.S. Pat. No. 5,076,940).

A process which avoids the formation of gypsum-type precipitates is described in U.S. Pat. No. 5,348,721. The disclosed method requires the initial production of a polyaluminum chlorosulfate of relatively high basicity (40–50%). This is then reacted with an alkaline-earth metal compound (e.g., calcium carbonate) and an alkaline-metal compound (sodium carbonate) at a temperature of 50 to 70 degrees centigrade. Reactions performed at lower temperatures (40 degrees centigrade) result in a product that coalesces into a gel. One problem with this process is that the generation of $CO_2$ may cause processing problems when reactions are performed on a large scale. Nevertheless, it appears that this is the only reported process which is capable of making polyaluminum chlorosulfates of greater than 67% basicity and a preparation which is 75.3% basic is disclosed in the patent specification. Because of the chemistry involved, all products are produced using substantial amounts of calcium carbonate.

An alternative process is disclosed in U.S. Pat. No. 3,929,666. In this patent, a solution containing sulfate ions is mixed with a solution containing both aluminum ions and halide ions and with a solution containing sodium or potassium aluminate. The reaction is carried out at a temperature of 40 degrees centigrade or less and produces a gel which must then be dissolved by raising its temperature to between 50 and 80 degrees centigrade. Because of the difficulty in efficiently pumping gels from one location to another and because of the problems which gels present in terms of mixing and heat transfer, the process disclosed in this patent is of limited value in large scale industrial applications.

The present invention is directed to a process which avoids many of the problems associated with previously disclosed methods. It can be used to produce compounds with basicities of greater than 70% using, as starting material, basic aluminum chlorides and basic aluminum chlorosulfates of low basicity (25% or less). The polyaluminum chlorides and polyaluminum chlorosulfates produced remain fluid, i.e. they do not coalesce into a gel, and the formation of calcium sulfate precipitates can be avoided. Further, they can be produced without the addition of heat, thus avoiding the formation of undesirable byproducts. As a result, the process is particularly well-suited to large scale industrial applications.

In addition, the process permits the formation of products with unique properties that are also part of the invention. Polyaluminum chlorosulfates can be produced which are greater than 75.3% basic and preparations of greater than 70% basicity can be produced without substantial amounts of calcium carbonate. In addition, concentrated preparations of high basicity polyaluminum chlorides and polyaluminum chlorosulfates can be obtained which contain $Al_{13}$, the form of aluminum generally believed to be the most efficient at removing impurities from water.

SUMMARY

The present invention is directed to a process for producing polyaluminum chlorides and polyaluminum chlorosulfates suitable for use as coagulants in water treatment. The first step in the process involves mixing a solution comprising sodium aluminate with a solution comprising either basic aluminum chloride (if the desired product is a polyaluminum chloride) or basic aluminum chlorosulfate (if the desired product is polyaluminum chlorosulfate). It is essential that these solutions be mixed under conditions of sufficiently high shear to prevent gel formation and that the reaction temperature be maintained below 50 degrees centigrade. When the reaction is carried out under these conditions, a non-viscous milky suspension is produced which will clear with time. In an optional second step, the temperature of the milky suspension is gradually increased until a clear product solution is obtained.

In preferred embodiments, the reaction between sodium aluminate and either basic aluminum chloride or basic aluminum chlorosulfate is carried out at, or below, 40 degrees centigrade and mixing occurs in the presence of a velocity gradient of at least 1000 reciprocal seconds. For reactions in which the basicity of the product is to be 70% or less, it is preferable that a small amount, e.g., less than 1%, of calcium carbonate be added to the solution of basic aluminum chloride or basic aluminum chlorosulfate before mixing with sodium aluminate. The addition of calcium carbonate to reactions which form products of greater than 70% basicity is entirely optional. It may be added if desired, but its inclusion does not appear to substantially improve the stability of products.

The basic aluminum chloride or basic aluminum chlorosulfate used as a reactant in the process can be made using a variety of methods well-known in the art. The preferred method for producing basic aluminum chloride is to react a source of aluminum oxide trihydrate with hydrochloric acid or a combination of hydrochloric acid and phosphoric acid. In the case of basic aluminum chlorosulfate, it is preferred that a source of aluminum oxide trihydrate be reacted with hydrochloric acid and sulfuric acid.

An optional fourth step may be included in the process in which the polyaluminum chloride or polyaluminum chlorosulfate produced as described above is used in a second reaction with sodium aluminate. This step is particularly useful in cases where very high basicity products are desired. As before, the mixing of reagents takes place at a shear force high enough to prevent gel formation, preferably in the presence of a velocity gradient of at least 1000 reciprocal seconds. When preparing polyaluminum chlorides of between 50% and 70% basicity, preparations can be mixed at a temperature below 60 degrees centigrade. For products of greater than 70% basicity, mixing should generally take place at a temperature of greater than 60 degrees centigrade in order to prevent gel formation. However, it is also possible to obtain a product of greater than 70% basicity in reactions carried out below 60 degrees centigrade by reducing the rate at which sodium aluminate is added to the reaction and by increasing the shear. The resulting milky suspension can be heated to produce a clear product or allowed to clear over time without additional heat being applied. In addition to being included as a fourth step in the present process, the reaction between polyaluminum chloride or polyaluminum chlorosulfate and sodium aluminate may be used to increase the basicity of polyaluminum chlorides and polyaluminum chlorosulfates made by other processes.

In addition to the processes described above, the present invention is directed to the polyaluminum chlorides and polyaluminum chlorosulfates produced by the processes. This includes compositions having polyaluminum chlorosulfates of greater than 75.3% basicity and compositions of greater than 70% basicity that do not utilize calcium carbonate or other alkaline earths. The present invention includes concentrated compositions (8% $Al_2O_3$ or greater) of polyaluminum chlorides and polyaluminum chlorosulfates containing $Al_{13}$ species. These species are detectable by NMR in preparations of about 80% basicity or greater.

In another aspect, the present invention is directed to a process for producing a coagulant composition useful in removing impurities from water by blending a polyaluminum chloride or a polyaluminum chlorosulfate with either an organic or an inorganic salt. The polyaluminum chloride or polyaluminum chlorosulfate should be blended in an amount so that its final concentration in the coagulant composition is less than about 25% by weight or more than about 75% by weight. Preferred salts are ferric chloride, ferric sulfate, ferrous sulfate, aluminum sulfate, aluminum chloride, and quaternary ammonium chlorides. The blended compositions themselves are also encompassed by the invention, as are processes for removing impurities from water which utilize these compositions. In the latter, the compositions are mixed with water that contains impurities, the mixture is allowed to flocculate, and the flocculent is then removed to produce water in which the concentration of impurities has been reduced.

BRIEF DESCRIPTION OF THE FIGURES

FIG. 1 shows the NMR spectrum given by polyaluminum chlorosulfate made according to the procedure disclosed in U.S. Pat. No. 3,929,666 (10.5% $Al_2O_3$, 2.8% $SO_4$, 50% basic). The main peak is at 0.210 ppm.

FIG. 2 depicts the NMR spectrum of polyaluminum chlorosulfate made according to the procedure disclosed in Example 6 (10.5% $Al_2O_3$, 50% basic, 2.9% $SO_4$). The process employed high shear mixing in order to prevent gel formation. The main peak is at 0.193 ppm FIG. 3.

FIG. 4 depicts the NMR spectrum obtained using commercially available Stern-PAC polyaluminum chlorosulfate. The main peak in the figure is at 0.488 ppm.

FIG. 5 depicts the NMR spectrum obtained using commercially available Westwood 700S polyaluminum chlorosulfate. The main peak in the figure is at 0.477 ppm.

FIG. 6 depicts the NMR spectrum of polyaluminum chloride made according to the procedure disclosed in Example 9 (10.5% aluminum oxide, 90% basic). The process employed high shear mixing in order to prevent gel formation. Note the presence of a peak at 63 ppm.

FIG. 7 depicts the NMR spectrum of polyaluminum chlorosulfate made according to the procedure disclosed in Example 10 (10.5% $Al_2O_3$, 88% basic, 0.2% $SO_4$). The process employed high shear mixing in order to prevent gel formation. Note the presence of a peak at 63 ppm.

FIG. 8 depicts the NMR spectrum obtained using commercially available aluminum chlorohydrate (Summit Chemical Co). Note the absence of a peak at 63 ppm.

DEFINITIONS

Polyaluminum Chlorides

Figure 1:
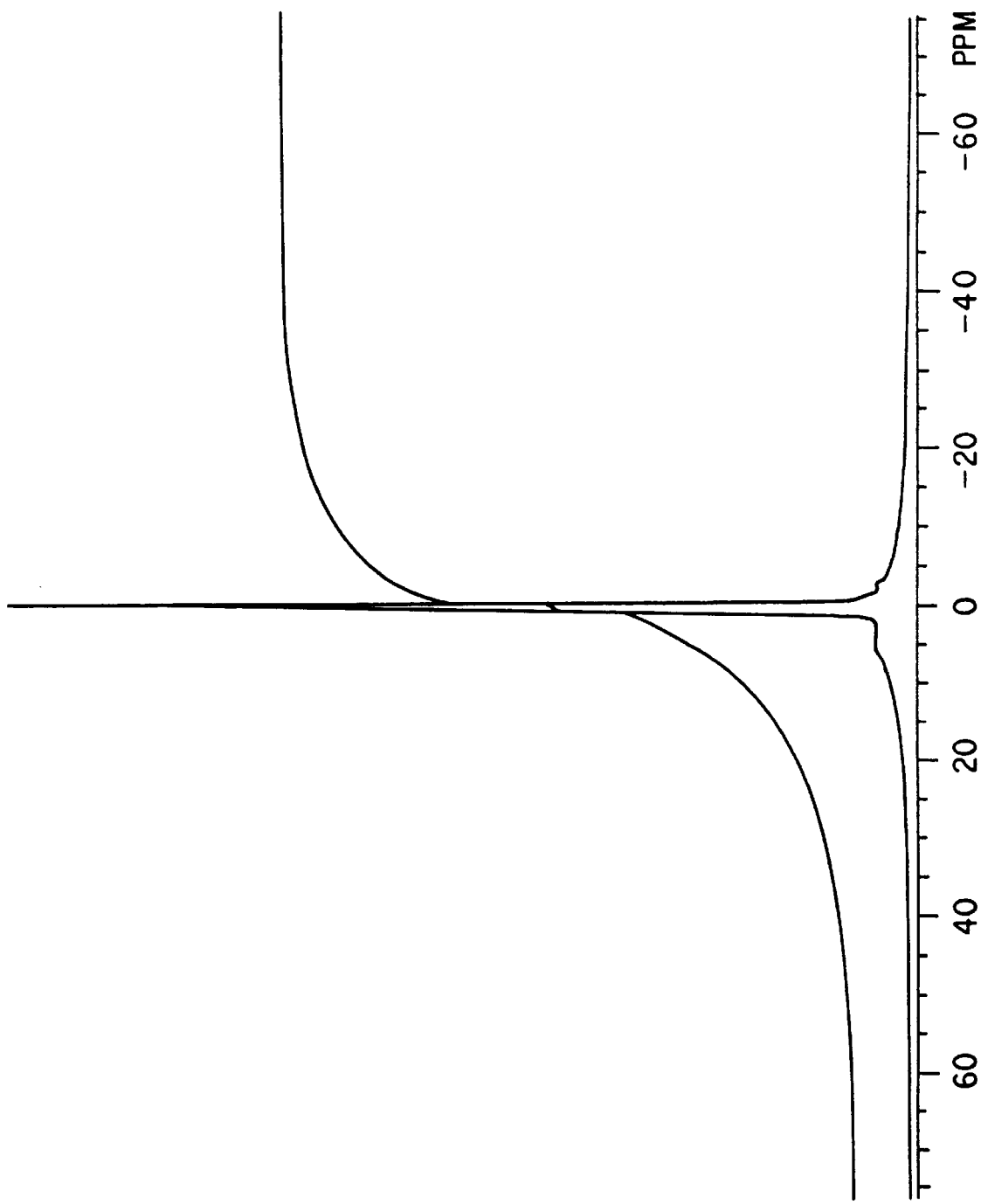
FIG. 1.

Polyaluminum chlorides are products of aluminum chloride hydroxide, $AlCl(OH)_2$, $AlCl_2(OH)$, and $Al_2Cl(OH)_5$. A representative formula is: $Al_2Cl_{6-n}(OH)_n$, where n=2.7 to 5 for products formed via the process disclosed herein. It is thought that, when these products are diluted, polymeric species such as: $Al_{13}O_4(OH)_{24}(H_2O)_{12}+7Cl$ are formed.

Polyaluminum Chlorosulfates

These compounds can best be described by the formula: $Al_2(OH)_nCl_{(6-n-2k)}(SO_4)_k$ wherein n=2.7 to 5 and k is greater than 0 and less than 4.3. The main difference between basic aluminum chlorosulfates and polyaluminum chlorosulfates is the amount of hydroxyl substitution; where n is less than or equal to 1.5 for the former and between 2.7 and 5 for the latter. The polymeric species formed upon dilution may be expressed as: $Al_{13}O_4(OH)_{24}(H_2O)_{12}+5Cl+SO_4$.

Basic Aluminum Chlorides

These are compounds having the formula: $Al_2(OH)_n(Cl)_{6-n}$ where n is greater than zero and less than or equal to 1.5. It is believed that solutions of these compounds contain: $Al(H_2O)_6+3Cl$; $Al_2(OH)_2(H_2O)_8+4Cl$; and $Al(OH)(H_2O)_5+2Cl$.

Basic Aluminum Chlorosulfates

These are compounds of the formula: $Al_2(OH)_nCl_{(6-n-2k)}(SO_4)_k$ wherein n is greater than zero and less than or equal to 1.5, and wherein k is greater than zero but less than 0.5. It is believed that solutions of these compounds contain all of the compounds present in basic aluminum chloride as well as: $Al(H_2O)_6+Cl+(SO_4)$; and $Al_2(OH)_2(H_2O)_8+2Cl+(SO_4)$.

Percent Basicity

As typically used in the art, percent basicity is defined as (% OH)(52.91)/(% Al). On a molar level, this may be expressed as ((OH)/(Al))/3 multiplied by 100. Thus, $Al(OH)(H_2O)_5+2Cl$ has a basicity of 33%. Basicities discussed in the text in connection with products made by the present procedure, e.g. the products disclosed in the Examples, reflect formula basicities based upon hydroxide content. It has been discovered that these products will hydrolyze to form species of higher basicity then formulated. The degree of hydrolysis is inversely proportional to concentration and directly proportional to formula basicity. Thus, the product of example 7, while formulated to be 70% basic, will analyze as 79% basic.

High Shear Mixing

As used herein, the term "high shear mixing" refers to combining solutions under conditions creating a shear force great enough to prevent gel formation. The shear force may be created by one or more homogenizers, blenders, centrifugal pumps or pressurized nozzles designed to forcibly combine solutions. In general, mixing should be carried out under conditions sufficient to create a velocity gradient of 1,000 reciprocal seconds or greater.

Aluminum Salt Concentration of Reaction Products

The concentration of aluminum salt stated as present in a reaction product refers to the amount of aluminum oxide that would have been necessary to make the product. Thus, products are described as having a certain percentage of $Al_2O_3$ even though the aluminum oxide may not actually be present in the product. This is common practice in the art and allows products to be compared based upon their chemistry.

Wet Filtercake

Wet filtercake is a purified product of bauxite. It is produced by digesting bauxite in sodium hydroxide and then precipitating out aluminum oxide trihydrate (also known as gibbsite). Typically, the filtercake contains 5 to 10% free moisture.

DETAILED DESCRIPTION OF THE INVENTION

I. General Overview of the Process

The present invention is directed to a process for producing polyaluminum chloride or polyaluminum chlorosulfate. Overall, it involves either making basic aluminum chloride or basic aluminum chlorosulfate and then reacting this compound with a solution of sodium aluminate. A novel feature is that the mixing of sodium aluminate with either basic aluminum chloride or basic aluminum chlorosulfate takes place under conditions of high shear in order to prevent the formation of a gel. The product solution is a milky suspension which can be readily pumped through machinery designed for high volume production. This solution can, optionally, be heated to eliminate its milkiness and produce a clear fluid containing polyaluminum chlorides or polyaluminum chlorosulfates suitable for use in water treatment. Alternatively, the milky product solution can simply be left to clear without applying additional heat.

Typically the process disclosed herein will be used to produce polyaluminum chlorosulfates formulated for 40% to over 80% basicity and which can be either used immediately or stored for a period of at least seven months without significant precipitate formation. Polyaluminum chlorides are unstable when they have basicities of 30% to 75%, i.e. they tend to form a precipitate over time. Thus, if a polyaluminum chloride coagulant is desired in the 20% to 45% basic range, the addition of phosphoric acid should be considered. For basicities of 45% and above, it will generally be preferable to use the process to produce polyaluminum chlorosulfates.

Optionally, the present invention may include a step in which the clear product solution containing either polyaluminum chloride or polyaluminum chlorosulfate is used in another reaction with sodium aluminate. This reaction provides a means for further increasing the basicity of reaction products and may also be used independently of the other steps of the process. Thus, the basicity of polyaluminum chlorides and polyaluminum chlorosulfates can be increased regardless of the specific process by which these compounds are made.

II. The Production of Basic Aluminum Chloride or Basic Aluminum Chlorosulfate Suitable for the Present Process Basic aluminum chloride or basic aluminum chlorosulfate may be produced by a wide variety of different procedures. Typical methods for making these compounds include: a) decomposing metallic aluminum with hydrochloric acid; b) exchanging hydroxide ions for chloride ions by passing a solution of aluminum chloride through an ion exchanger; c) reacting aluminum hydroxide with hydrochloric acid or a combination of hydrochloric acid and sulfuric acid; d) neutralizing a solution of aluminum chloride with an alkali; and e) reacting alumina trihydrate with hydrochloric acid under pressure.

A. Preferred Method for Making Basic Aluminum Chloride

Although any of the above procedures could be used to produce material suitable for the present process, the preferred method for making basic aluminum chloride is to react a source of aluminum oxide trihydrate with hydrochloric acid. The objective of this reaction is to produce a product that is between about 5% and about 25% basic. It is desirable to make the compound as basic as economically feasible in that basic aluminum chlorides and basic aluminum chlorosulfates of low basicity require more sodium aluminate to produce a desired polyaluminum chloride or polyaluminum chlorosulfate product. Because sodium aluminate has sodium hydroxide associated with it, increasing its amount means that more salt will be generated when solutions are neutralized and that the overall process will become more costly. Higher basicity basic aluminum chloride or basic aluminum chlorosulfate can be made by increasing the amount of excess aluminum oxide trihydrate used in the reaction, reducing the amount of water in the reaction, maintaining a higher reaction temperature, or by allowing the batch to react longer. Up to four percent phosphoric acid may be added to prevent crystallization of lower basicity or higher concentration products. Small amounts of phosphoric acid may also be added to higher basicity products to increase the floc particle size when the polyaluminum chloride is used as a flocculent. In general, the amount of phosphoric acid should not exceed 0.5% in products greater than 75% basic or the product will become too viscous to handle.

The preferred reaction may be carried out to produce basic aluminum chloride of 5% to 25% basicity using wet filtercake of 50% to 65% aluminum oxide. The filtercake is reacted with a solution of 30% to 35% hydrochloric acid while maintaining the reaction temperature between 60 and 115 degrees centigrade. Typically, 5 moles of hydrochloric acid are added per mole of aluminum oxide to make basic aluminum chloride. To make basic aluminum chlorosulfate, 4 to 5 moles of hydrochloric acid and 0.02 to 0.5 moles of sulfuric acid would typically be used per mole of aluminum oxide. Increasing the time that the reaction is allowed to proceed increases the basicity of the product. In general, reactions of between 4 and 24 hours have been found to produce a suitable product. The reaction can be accelerated by grinding the filtercake to smaller particle sizes, increasing the concentration of hydrochloric acid or utilizing elevated pressures and temperatures. However, these methods for accelerating reactions significantly increase the cost of production and are, preferably, avoided.

B. Preferred Method for Making Basic Aluminum Chlorosulfate

The preferred method for making basic aluminum chlorosulfate is similar to the method described above for basic aluminum chloride except that sulfuric acid is substituted stoichiometrically for part of the hydrochloric acid. The amount of sulfuric acid which should be used depends upon the desired amount of sulfate in the final polyaluminum chlorosulfate product. Specifically, the amount of sulfate in the product may not exceed the amount in the equation: % sulfate=(10.5−(0.125×% basic))×(% $Al_2O_3$/10.5).

If the percent sulfate in the above equation is exceeded, the polyaluminum chlorosulfate will become gel-like and difficult to handle. The optimum percentage of sulfate that should be present in a polyaluminum chlorosulfate for peak effectiveness as a flocculent in water treatment will vary in accordance with the specific characteristics of the water. As long as it does not exceed the percentage indicated by the above equation, sulfate concentration may be adjusted to produce the optimum product for a given application. In general, the percentage sulfate in basic aluminum chlorosulfate should be between zero and eight percent to yield polyaluminum chlorosulfate of between zero and six percent. Typical formulations are given below in Examples 2, 3 and 4.

III. Reaction of Basic Aluminum Chloride or Chlorosulfate With Sodium Aluminate

The basic aluminum chloride or basic aluminum chlorosulfate described above is reacted with a solution of sodium aluminate. For reactions in which the product will have a basicity of 70% or less, it is preferred that a small amount of an alkaline-earth metal compound (e.g., 0 to 1% calcium carbonate) be added to the solution of basic aluminum chloride or basic aluminum chlorosulfate to serve as a stabilizer prior to the addition of sodium aluminate. Failure to add the stabilizer may cause product solutions to have a slight haze or to form small amounts of precipitate. In general, the lower the basicity of the product, the more desirable is the addition of stabilizer. For products where the basicity is greater than 70%, calcium carbonate will not substantially improve stability. However, it will not adversely affect products and may be added if desired.

The amount of sodium aluminate to be combined with basic aluminum chloride or basic aluminum chlorosulfate will depend upon the desired basicity of the final product and may be determined according to the following equation, in which all percentages are expressed as such, without being divided by 100 (e.g., 15% is expressed as 15, not 0.15):

$$\% \text{ BAC or \% BACS} = \frac{(SAA \times PA \times PB - SAOH \times 100 \times PA - SAA \times CC \times 33.98)}{(BB \times BA \times SAA / 100 - BB \times SAOH)}$$

where:
BAC=basic aluminum chloride
BACS=basic aluminum chlorosulfate
SAA=percent $AL_2O_3$ in sodium aluminate
SAN=percent $Na_2O$ in sodium aluminate
SAOH=percent hydroxide in sodium aluminate
  =SAA+(SAN×0.54865)
PA=desired percent $AL_2O_3$ in polyaluminum chloride or polyaluminum chlorosulfate
PB=desired basicity in polyaluminum chloride or polyaluminum chlorosulfate CC=desired percent of $CaCO_3$ wanted in polyaluminum chloride or polyaluminum chlorosulfate
BB=percent basicity in basic aluminum chloride or basic aluminum chlorosulfate
BA=percent $Al_2O_3$ in basic aluminum chloride or basic aluminum chlorosulfate Similarly the amount of sodium aluminate necessary to yield the proper formulation can be determined by using the following equation:

$$\% \text{ sodium aluminate} = (PA \times PB - B \times BB \times BA / 100 - CC \times 0.3398)/SAOH$$

where
B=percent basic aluminum chloride or basic aluminum chlorosulfate as determined by the equation above.

Water should be added to the reaction in an amount that will be determined by the final desired percentage of $Al_2O_3$. For example, if the percentage of aluminum oxide in the reactants was 20% and it was desired that the final product have an aluminum oxide concentration of 10%, then the mass of water added should equal the total mass of the reactants. In order to reduce the amount of heat generated during reactions, it is preferred that cold water be added to sodium aluminate and that the resulting solution then be mixed with the solution containing basic aluminum chloride or basic aluminum chlorosulfate. The temperature of the reaction must be maintained below 50 degrees centigrade, and preferably below 40 degrees centigrade. If temperatures higher than 50 degrees centigrade are used when mixing, species not suitable for water treatment will form. In addition, the product will tend to have a reduced shelf life.

An essential aspect of the reaction described above is that the sodium aluminate solution and the solution containing basic aluminum chloride or basic aluminum chlorosulfate be combined under conditions of high shear mixing. High shear mixing is a procedure that can be accomplished using a wide variety of different devices. For example, such mixing can be accomplished using a blender or homogenizer (see e.g., U.S. Pat. No. 5,149,400), with centrifugal pumps, or through the use of machinery that forces streams of solution together at high pressure (see e.g., U.S. Pat. No. 3,833,718). Mathematically, high shear mixing may be expressed in terms of fluid shear rate, which is defined as a velocity gradient:

$$\frac{dv}{dy} = \frac{(\text{peripheral speed}) \text{ ft./sec.}}{(\text{impeller gap}) \text{ ft.}}$$

and which has units of reciprocal time, i.e., sec.$^{-1}$ (see Oldshue, *Fluid Mixing Technology*, McGraw-Hill, page 24 (1983)). Velocity gradients of 1,000 reciprocal seconds or more are generally considered to constitute high shear mixing conditions.

The preferred means of mixing is through the use of a centrifugal pump. For example, one practicing the invention could use a 2 inch (5.1 cm) diameter, 15 hp. centrifugal pump with a 10 inch (25.4 cm) impeller spinning at 1200 rpm (see e.g. model 3196 MTX made by Goulds Pumps Inc., Seneca Falls N.Y. The velocity gradient created by such a pump would be:

$$\frac{dv}{dy} = \frac{(52.4 \text{ ft./sec}) \times (12 \text{ in./ft})}{(.375 \text{ in.})} = \frac{(1597 \text{ cm/sec})}{(0.9525 \text{ cm})} = 1676.8 \text{ sec.}^{-1}$$

Typically, the flow rate of material through the pump should be between 50 and 250 gallons (189 to 946 liters) per minute. The quicker the mixture flows through the pump the less total shear the mixture will experience. Thus, total shear can be increased by partially closing a flow valve, to reduce flow rate.

It may also be desirable to include one or more additional centrifugal pumps to recirculate the mixture and add additional shear to the process. For example, high shear conditions could be generated using a commercially available 2 inch (5.1 cm) diameter, 15 hp. centrifugal pump with a 5¼ inch (13.3 cm) impeller spinning at 3500 rpm. This would create a velocity gradient of over 2500 reciprocal seconds;

$$\frac{dv}{dy} = \frac{(80.0 \text{ft./sec.}) \times (12 \text{in./ft.})}{(.375 \text{in.})} = \frac{(2438.4 \text{cm/sec.})}{(.9525 \text{cm})} = 2560 \text{sec.}^{-1}$$

By way of comparison, if one was to make a batch in a conventional reactor using a good agitator and the process described in U.S. Pat. No. 3,929,666, very little shear would be present. For example if we assume the following typical parameters: 900 gallons (3407 liters) of material in a conventional 1,000 gallon (3785 liter) reactor; a 29.5" (74.9 cm) diameter mixing blade; a gap between blade and baffle of 5.25" (13.3 cm); and at a rotor speed of 100 rpm then the peripheral speed of the agitator of the agitator would be 13 ft./sec. (396.2 (cm/sec.) and the velocity gradient is as follows.

$$\frac{dv}{dy} = \frac{(13.0 \text{ft./sec.}) \times (12 \text{in./ft.})}{(5.25 \text{in.})} = \frac{(396.2 \text{cm/sec.})}{(13.3 \text{cm})} = 29.7 \text{sec.}^{-1}$$

In general, it is preferred that solutions in the present process be mixed under velocity gradients which are as high as can be practically achieved using the available equipment and taking into consideration desired reaction temperature. For small scale preparations, mixing can be accomplished using a blender or homogenizer. For larger scale preparations, high shear mixing can be accomplished using centrifugal pumps or with on line homogenizing machinery.

The mixing of solutions under the conditions described above is necessary to prevent gel formation and results in a non-viscous suspension. It is believed that the beneficial effects of high shear mixing result from the elimination of local concentration inhomogeneities created when solutions are combined and from the disintegration of gelatinous particles before they can coalesce. Unlike a gel, the suspension formed in the present process can easily be heated, agitated, pumped or cooled.

Any type of commercially available sodium aluminate is acceptable for use in making polyaluminum chloride or polyaluminum chlorosulfate. In general, high mole ratio sodium aluminates produce more by-product salt while low mole ratio sodium aluminates may be more difficult to handle. It has been found that satisfactory products can be made using sodium aluminates with mole ratios, i.e., $Na_2O/Al_2O_3$, of 1.15 to 2.0. Other hybrid sodium aluminates may also be used. Sodium silicate may be present up to 10% $SiO_2$. Potassium aluminate may be substituted for any portion of the sodium aluminate on an equivalent molar basis.

Using the process discussed above, polyaluminum chlorides or polyaluminum chlorosulfates can be made in concentrations of 17% aluminum oxide or higher. At concentrations above 17%, by-product sodium chloride may be removed by filtration. Typical reactions designed to produce polyaluminum chlorides are given below in Examples 5 and 8 and two typical formulations used in making polyaluminum chlorosulfates are provided in Examples 6 and 7.

IV. Clarification of Polyaluminum Chloride or Polyaluminum Chlorosulfate Solutions The reaction between sodium aluminate and either basic aluminum chloride or basic aluminum chlorosulfate results in the formation of a milky, non-viscous suspension. Optionally in a second step of the process, the solution may be heated until the milkiness clears. The time necessary to achieve clarification can be decreased by lowering the temperature at which the basic aluminum chloride or basic aluminum chlorosulfate is reacted with sodium aluminiate, decreasing the concentration of $Al_2O_3$ in the product, or by increasing the amount of shear during mixing. Too rapid heating will produce products that perform poorly or which become unstable. Thus, the heating process should be carried out in a manner in which the temperature throughout the solution is gradually increased in as uniform a manner as possible.

In general, higher basicity products take longer to clear than lower basicity products. For basicities of greater than 80%, it will typically be necessary to heat product solutions up to 85 degrees centigrade. Basicities of 65% to 80% generally require temperatures of between 30 and 80 degrees centigrade.

V. Increasing the Basicity of Polyaluminum Chlorides or Polyaluminum Chlorosulfates by Carrying Out a Second Reaction With Sodium Aluminate Optionally, a second reaction can be carried out using sodium aluminate to further increase the basicity of products. If processing problems are encountered in trying to make high basicity and/or high sulfate products, these can usually be avoided by producing polyaluminum chloride or polyaluminum chlorosulfate of at least 45% basicity using the procedure described above and then adding a solution of sodium aluminate under conditions of high shear mixing. In order to prevent gel formation for products with basicities of greater than 70%, the reaction temperature should generally be maintained above 60 degrees centigrade, although it is also possible to avoid gel formation by reducing the rate at which sodium aluminate is added to the reaction and increasing the shear force of mixing. For products with a basicity of less than 70%, any convenient temperature below 75 degrees may be used. As before, the amount of sodium aluminate added will be determined based upon the desired basicity of the final product and can be determined as described in the equation set forth above. Water may also be included in the reaction to adjust the final concentration of $Al_2O_3$. It is preferred that water be added to sodium aluminate before mixing it with the solution containing polyaluminum chloride or polyaluminum chlorosulfate. After this reaction, the product solution should be allowed to stand for a period of time sufficient to allow it to clear, typically less than about a day. Optionally, heat may be applied to reduce the time necessary to clear the solution. Typical formulations demonstrating the reaction are given in Examples 9 and 10.

The reaction with sodium aluminate may also be used to increase the basicity of polyaluminum chlorides and polyaluminum chlorosulfates made by processes other than the process described in sections III and IV. Thus, polyaluminum chlorides and polyaluminum chlorosulfates produced by any process whatsoever may serve as reactants and mixed with sodium aluminate under conditions of high shear. The reaction will then proceed in exactly the same manner as discussed above.

VI. Properties of Polyaluminum Chlorides and Polyaluminum Chlorosulfates Made by the Present Methods The polyaluminum chloride and polyaluminum chlorosulfate preparations made by the present methods have several unusual characteristics which set them apart from other similar products. First, polyaluminum chlorosulfates can be produced which are unique in terms of their basicity, greater than 75.3%. In addition, it is possible to produce preparations of polyaluminum chlorosulfates with a basicity of greater than 70% which do not contain calcium carbonate or other alkaline earths. Although the disclosed methods for producing polyaluminum chlorosulfates of greater than 70% basicity sometimes include the addition of calcium carbonate, this is entirely optional and a final product can be produced in its absence which is stable and suitable for water treatment.

In addition, the high basicity polyaluminum chlorides and polyaluminum chlorosulfates produced by the disclosed methods contain, in their concentrated state, polymeric species not present in similar preparations. Specifically, preparations of polyaluminum chloride of 8% aluminum oxide or greater and having a basicity of about 80% or greater contain $Al_{13}O_4(OH)_{24}(H_2O)_{12}+7Cl$. As discussed in Example 12, $Al_{13}$ may be detected in high basicity products by NMR. Similarly, preparations of polyaluminum chlorosulfate of 8% aluminum oxide or greater contain $Al_{13}O_4(OH)_{24}(H_2O)_{12}+5Cl+SO_4$. Polymeric species containing $Al_{13}$ are believed to be the ones that are most efficient at precipitating impurities from water. Although such species are present in dilute solutions, they have not previously been reported in concentrated preparations of either polyaluminum chlorides or polyaluminum chlorosulfates.

VII. Use of the Polyaluminum Chlorides and Polyaluminum Chlorosulfates Produced by the Present Process The polyaluminum chlorides and polyaluminum chlorosulfates made by the methods discussed above are effective in removing impurities from water. As discussed in Example 13, these products consistently outperform similar products made by other procedures. Products may be stored for long periods of time without losing their effectiveness, shipped to water treatment plants and then used either directly or after dilution.

In addition, it has been discovered that the polyaluminum chloride and polyaluminum chlorosulfate products of the present invention may be used in conjunction with other commercially available coagulents to improve overall performance. Specifically, the polyaluminum chlorides or polyaluminum chlorosulfates can be used together with ferric chloride, ferric sulfate, ferrous sulfate, aluminum sulfate, aluminum chloride, eppiamines, or quaternary ammonium chlorides.

The polyaluminum chlorides and polyaluminum chlorosulfates can be blended with the above-noted coagulants and maintain effectiveness and stability for a period of at least a month. Although the organic polymers can be blended in any proportion, the inorganic salts may only be blended with up to 25% by weight of polyaluminum chloride or polyaluminum chlorosulfate or, alternatively with over 75% by weight of polyaluminum chloride or polyaluminum chlorosulfate.

The addition of the polyaluminum chlorides or polyaluminum chlorosulfates to coagulants such as those noted above increases the size of floc particles formed during coagulation. The addition can allow the dosage of coagulant necessary to achieve a desired level of coagulation to be reduced (see Example 14) thus reducing the extent to which pH is lowered and decreasing the amount of coagulant sludge formed during the process.

The Examples below are for illustrative purposes only and are not intended to limit the scope of the invention.

EXAMPLES

Example 1

Production of Basic Aluminum Chloride (First Example)

10,762 kg of wet filtercake (59% $Al_2O_3$) is mixed with 34,599 kg of hydrochloric acid (31.5%) and the mixture is allowed to react for 20 hours at 115 degrees centigrade. This produces 45,081 kg of basic aluminum chloride (13.6% $Al_2O_3$, 20.6% basic). The basic aluminum chloride produced by the reaction can be used in the subsequent steps of the process to make a polyaluminum chloride of 10.5% $Al_2O_3$ and 83% basicity.

Example 2

Production of Basic Aluminum Chlorosulfate (First Example)

10,762 kg of wet filter cake (50% $Al_2O_3$) is mixed with 27,433 kg of hydrochloric acid (31.5%), 2,377 kg of sulfuric acid (93.5%) and 2,972 kg of water. The reaction is continued for 12 hours at 115 degrees centigrade to produce 44,941 kg of basic aluminum chlorosulfate (13.4% $Al_2O_3$, 18.0% basic, 4.9% $SO_4$). This formulation of basic aluminum chlorosulfate can be used in the subsequent reaction steps of the process to make polyaluminum chlorosulfate of 10.5% $Al_2O_3$, 2.9% $SO_4$ and 50% basicity.

Example 3

Production of Basic Aluminum Chlorosulfate (Second Example)

10,762 kg of wet filter cake (59% $Al_2O_3$) is mixed with 30,449 kg of hydrochloric acid (31.5%), 1,843 kg sulfuric acid (93.5%) and 2,303 kg of water. The reaction is carried out for 12 hours at 115 degrees centigrade to produce 44,941 kg of basic aluminum chlorosulfate which is 13.4% $Al_2O_3$, 18.0% basic and 3.8% $SO_4$. The formulation can be used to make a polyaluminum chlorosulfate of 10.5% $Al_2O_3$, 70% basicity and 1.7% $SO_4$.

Example 4

Production of Basic Aluminum Chlorosulfate (Third Example)

10,762 kg of wet filter cake (59% $Al_2O_3$) is mixed with 34,057 kg of hydrochloric acid (31.5%), 243 kg of sulfuric acid (93.5%) and 297 kg of water. The reaction is carried out for 12 hours at 115 degrees centigrade to produce 44,941 kg of basic aluminum chlorosulfate which is 13.4% $Al_2O_3$, 18.0% basic and 0.5% $SO_4$. This formulation can be used to make a polyaluminum chlorosulfate of 10.5% $Al_2O_3$, 80% basicity and 0.2% $SO_4$. Alternatively, a product can be made which is 10.5% $Al_2O_3$, 50% basic and 0.3% $SO_4$.

Example 5

Reaction of Sodium Aluminate with Basic Aluminum Chloride 7,598 kg of sodium aluminate (25.5% $Al_2O_3$, 20.0% $Na_2O$, 1.29 mole ratio) is mixed with 24,164 kg of water and then combined under conditions of high shear mixing with 45,081 kg of basic aluminum chloride (13.6% aluminum oxide, 20.6% basic). The temperature during reaction is kept below 40 degrees centigrade. The reaction results in the formation of 76,843 kg of polyaluminum chloride (10.5% $Al_2O_3$, 51% basic).

Example 6

Reaction of Sodium Aluminate with Basic Aluminum Chlorosulfate (First Example)

44,941 kg of basic aluminum chlorosulfate (13.4% $Al_2O_3$, 18.0% basic, 4.9% $SO_4$) is mixed with 285 kg of calcium carbonate. 7,751 kg of sodium aluminate (25.5% $Al_2O_3$, 20.0% $Na_2O$, 1.29 mole ratio) is separately mixed with 23,274 kg of water. The diluted solution of sodium aluminate is mixed under conditions of high shear with the basic aluminum chlorosulfate/calcium carbonate solution to form 76,089 kg of polyaluminum chlorosulfate (10.5% $Al_2O_3$, 50% basic, 2.9% $SO_4$). Reaction temperature is kept below 40 degrees centigrade.

Example 7

Reaction of Sodium Aluminate with Basic Aluminum Chlorosulfate (Second Example)

44,941 kg of basic aluminum chlorosulfate (13.4% $Al_2O_3$, 18.0% basic, 3.8% sulfate) is combined with 362 kg calcium carbonate. Separately, 16,155 kg of sodium aluminate (25.5% $Al_2O_3$, 20.0% sodium oxide, 1.29 mole ratio) is combined with 35,288 kg of water. The diluted sodium aluminate solution is then combined under conditions of high shear mixing with the basic aluminum chlorosulfate/calcium carbonate solution to produce 96,586 kg of polyaluminum chlorosulfate (10.5% $Al_2O_3$, 79% basic, 1.7% $SO_4$).

Example 8

Reaction of Sodium Aluminate with Basic Aluminum Chloride 45,081 kg of basic aluminum chloride made according to Example 1 is mixed with 9,465 kg of 41% sodium aluminate solution (25.5% $Al_2O_3$, 19.7% $Na_2O$, 1.27 mole ratio) and 2,824 kg of water through a high shear mixing pump at 30 degrees centigrade. The solution is gradually warmed by recycling material through a heat exchanger. After the mixture reaches a temperature of 65 degrees centigrade, it assumes the appearance of a clear solution. At this point, 13,428 kg of sodium aluminate solution (25.5% $Al_2O_3$, 19.7% $Na_2O$, 1.27 mole ratio) is slowly added to the mixture along with, proportionately, 4,006 kg of water. Mixing again takes place using the high shear mixing pump and the addition takes place over a period of about 2 hours. During this time, the solution is also gradually heated to 80 degrees centigrade. This temperature is then maintained for an additional hour to yield a clear solution containing 74,801 kg of polyaluminum chloride (16% $Al_2O_3$, 83% basicity).

Example 9

Reacting Polyaluminum Chloride with Sodium Aluminate

The procedure described above is used to produce polyaluminum chloride (10.5% $Al_2O_3$, 51% basic) which will serve as a reactant. 17,394 kg of sodium aluminate (25.5% $Al_2O_3$, 20% $NA_2O$, 1.29 mole ratio) is combined with 24,848 kg of water and the solution thus formed is combined under conditions of high shear mixing with 76,843 kg of the polyaluminum chloride reactant to form 119,085 kg of polyaluminum chloride product (10.5% aluminum oxide, 90% basic). After the basic polyaluminum chloride product solution has been formed, it can be clarified by gradually bringing its temperature to about 95° C.

Example 10

Reacting Polyaluminum Chlorosulfate with Sodium Aluminate

Using the procedures described above, polyaluminum chlorosulfate (10.5% $Al_2O_3$, 51% basic, 0.3% $SO_4$ is made which will serve as a reactant. 14,940kg of sodium aluminate (25.5% $Al_2O_3$, 20.0 $Na_2O$, 1.29 mole ratio) is combined with 21,344 kg of water. The sodium aluminate solution is then combined with 76,233 kg of the basic polyaluminum chlorosulfate reactant under conditions of high shear mixing to produce 112,517 kg of polyaluminum chlorosulfate product (10.5% $Al_2O_3$, 88% basic, 0.2% $SO_4$). The product solution is clarified by gradually increasing its temperature, e.g., over a period of about 30 minutes.

Example 11

Detailed Example of the Process for Making Polyaluminum Chlorosulfate 15,903 kg of 31.5% hydrochloric acid, 1,352 kg of water and 1,761 kg of 93.5% sulfuric acid are added to a 10,000 gallon (37,850 liter) brick-lined, rubber coated steel reactor equipped with an agitator and fume scrubber. While the solution is being agitated, 9,869 kg of aluminum oxide wet filtercake (59% $Al_2O_3$) is added such that a slurry is maintained. The mixture is recycled through a heat exchanger to raise it temperature to 60 degrees centigrade. Although the application of external heat is stopped at this point, the exothermic reaction forming aluminum chlorosulfate continues to raise the batch temperature. An additional 15,903 kg of 31.5% hydrochloric acid is then added to the batch such that the temperature does not exceed 90 degrees centigrade or fall below 60 degrees centigrade. If the temperature is allowed to exceed 90 degrees at this time, there is a risk of the batch boiling out of the reactor. If the temperature falls below 60 degrees, the batch may require additional heating to continue the reaction.

At some point during the hydrochloric acid addition, the temperature of the batch begins to fall. This occurs because the endothermic reaction of aluminum chlorosulfate with aluminum oxide trihydrate to form basic aluminum chloride or basic aluminum chlorosulfate begins to absorb heat from the reactor. Once this occurs, the operation of the heat exchanger is resumed in order to maintain the batch temperature just below boiling, 115 degrees centigrade. The reactor is held at this temperature for 8 hours to produce basic aluminum chlorosulfate having the following analysis: 12.5% $Al_2O_3$; 3.6% $SO_4$; 1.0% OH; 8.0% basicity; 21.8% chloride.

The basic aluminum chlorosulfate solution is cooled by the heat exchanger until the temperature reaches 30 degrees centigrade. At this point, 364 kg of calcium carbonate is added to the reactor. The unreacted aluminum oxide trihydrate is allowed to settle to the bottom of the reactor for about an hour. At the end of this time, the decanted solution is pumped to a holding tank. A 41% sodium aluminate solution is injected at a rate of about 2.6 gallons (9.8 liters) per minute into a pipe containing water flowing at a rate of about 8.9 gallons (33.7 liters) per minute. This mixture is then injected into a pipe recirculating the basic aluminum chlorosulfate at a flow rate of about 280 gallons (1,060 liters) per minute. The combined mixture is then immediately sheared by pumping it through a 6 inch (15.3 cm) diameter, 20 hp. centrifugal pump with a 6¹⁄₁₆ inch (15.4 cm) impeller spinning at 3,500 rpm. After leaving the pump, the mixture flows through a cooling heat exchanger and then back to the tank. When the procedure is complete, the following have been added to the holding tank: 44,788 kg of basic aluminum chlorosulfate; 17,755 kg of 41% sodium aluminate (25.9% $Al_2O_3$, 20.2% $Na_2O$); and 34,368 kg of water.

The procedure above yields a non-viscous milk-white suspension which gradually clears within 1 day. The product produced is polyaluminum chlorosulfate, which is 79% basic and which has 10.5% $Al_2O_3$ and 1.7% $SO_4$.

Example 12

Figure 2:
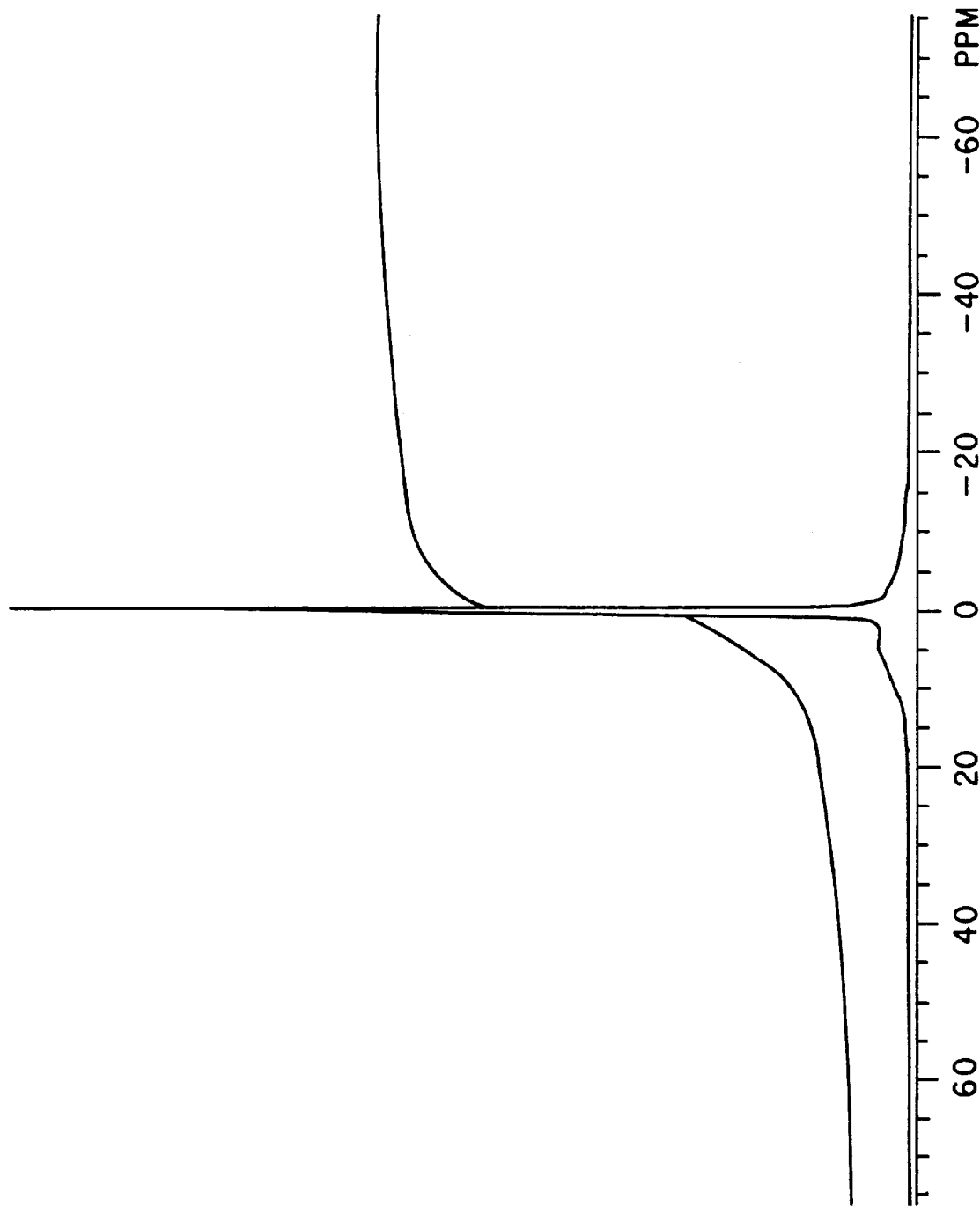
FIG. 2.
Figure 3:
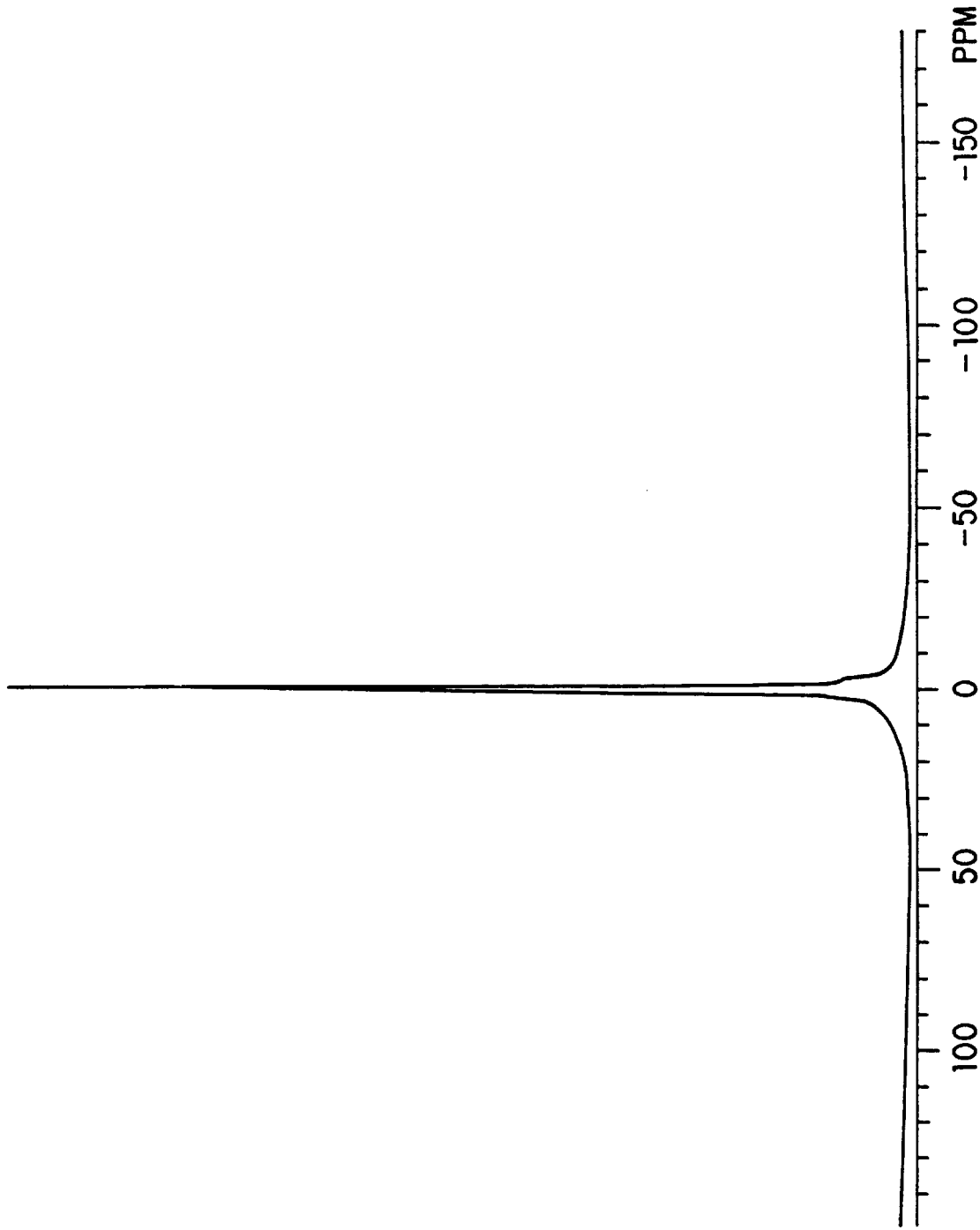
FIG. 3 shows the NMR spectrum obtained from a preparation of basic aluminum chlorosulfate made using the procedure of Example 3 (13.4% $Al_2O_3$, 18.0% basic and 3.8% $SO_4$). The main peak is at 0.93 ppm.

NMR Analysis of Preparations of Polyaluminum Chloride and Polyaluminum Chlorosulfate NMR spectra were obtained for preparations made by the methods disclosed above and compared to spectra for similar, commercially available products. The results suggest that, as the basicity of products is increased, the Al proton shifts upward in frequency. For example, basic aluminum chloride made according to the procedure described in Example 3 (13.4% $Al_2O_3$, 18.0% basic and 3.8% $SO_4$) was found to have its peak at 0.93 ppm (FIG. 3) whereas polyaluminum chlorosulfate made according to Example 6 above (50% basic) has its peak at 0.193 (FIG. 2).

Figure 4:
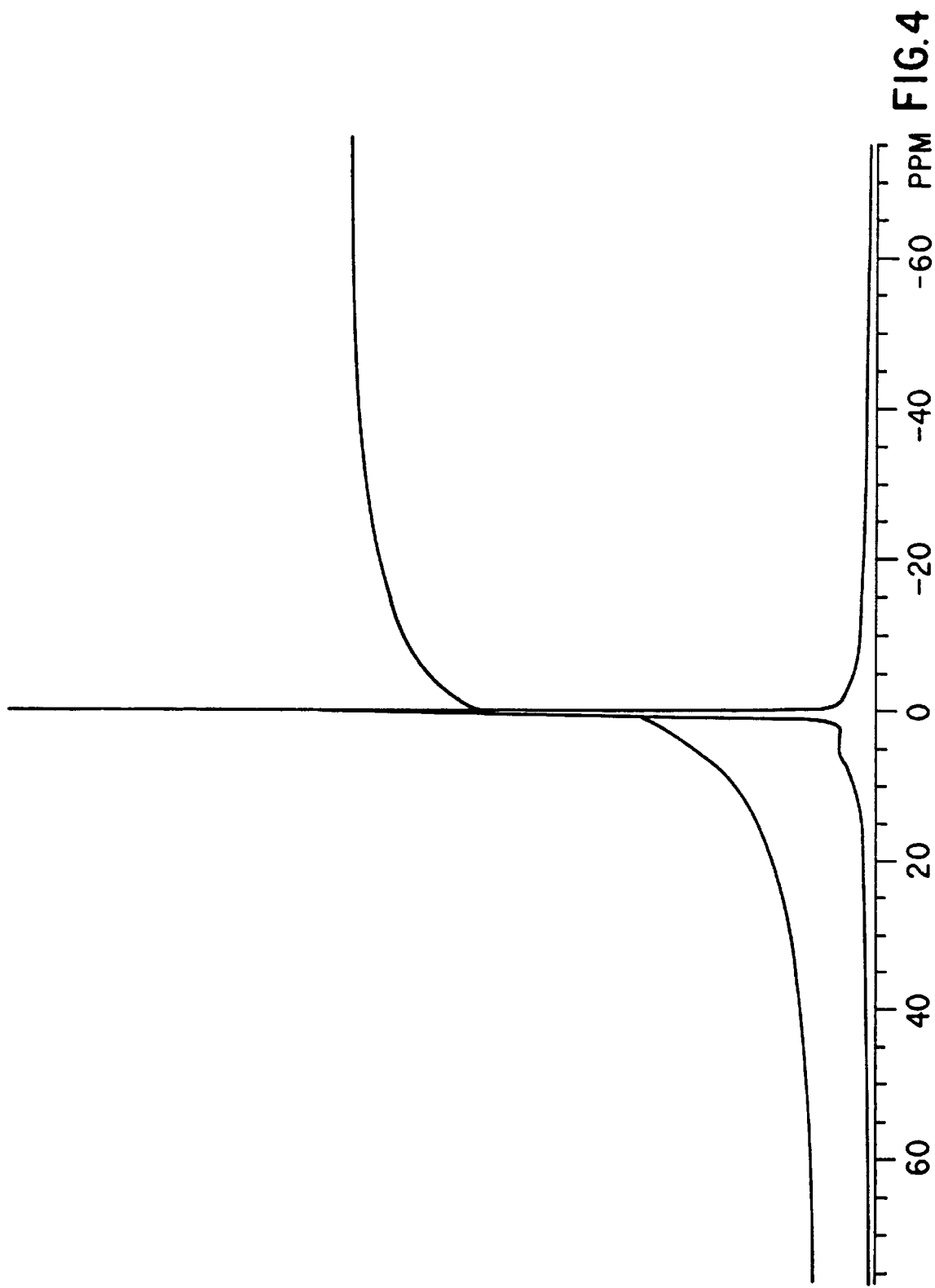
FIG. 4.
Figure 5:
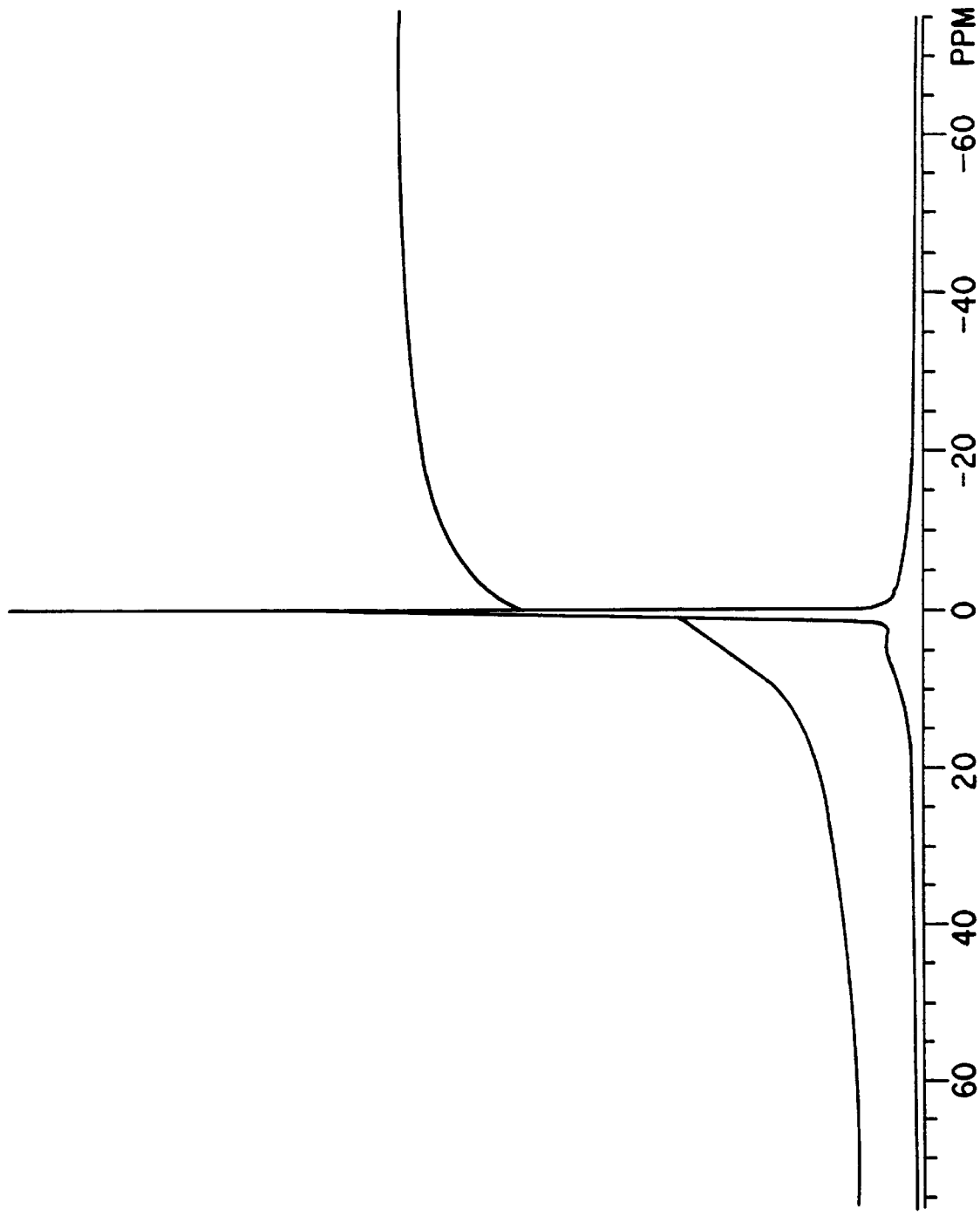
FIG. 5.

Polyaluminum chlorosulfate made according to the procedure disclosed in U.S. Pat. No. 3,929,666 (10.5% $Al_2O_3$, 2.8% SO4, 50% basic) gave a spectrum (FIG. 1) that appears to be essentially identical to the spectrum of the product made according to Example 6 above (polyaluminum chlorosulfate: 10.5% $Al_2O_3$, 50% basic, 2.9% $SO_4$). However, the spectrum for the product of Example 6 differs significantly from two other products having similar basicities and sulfate contents. Specifically, Stern-PAC polyaluminum chlorosulfate has its peak at 0.488 ppm (FIG. 4) and Westwood 700S polyaluminum chlorosulfate has its peak at 0.477 ppm (FIG. 5).

Figure 6:
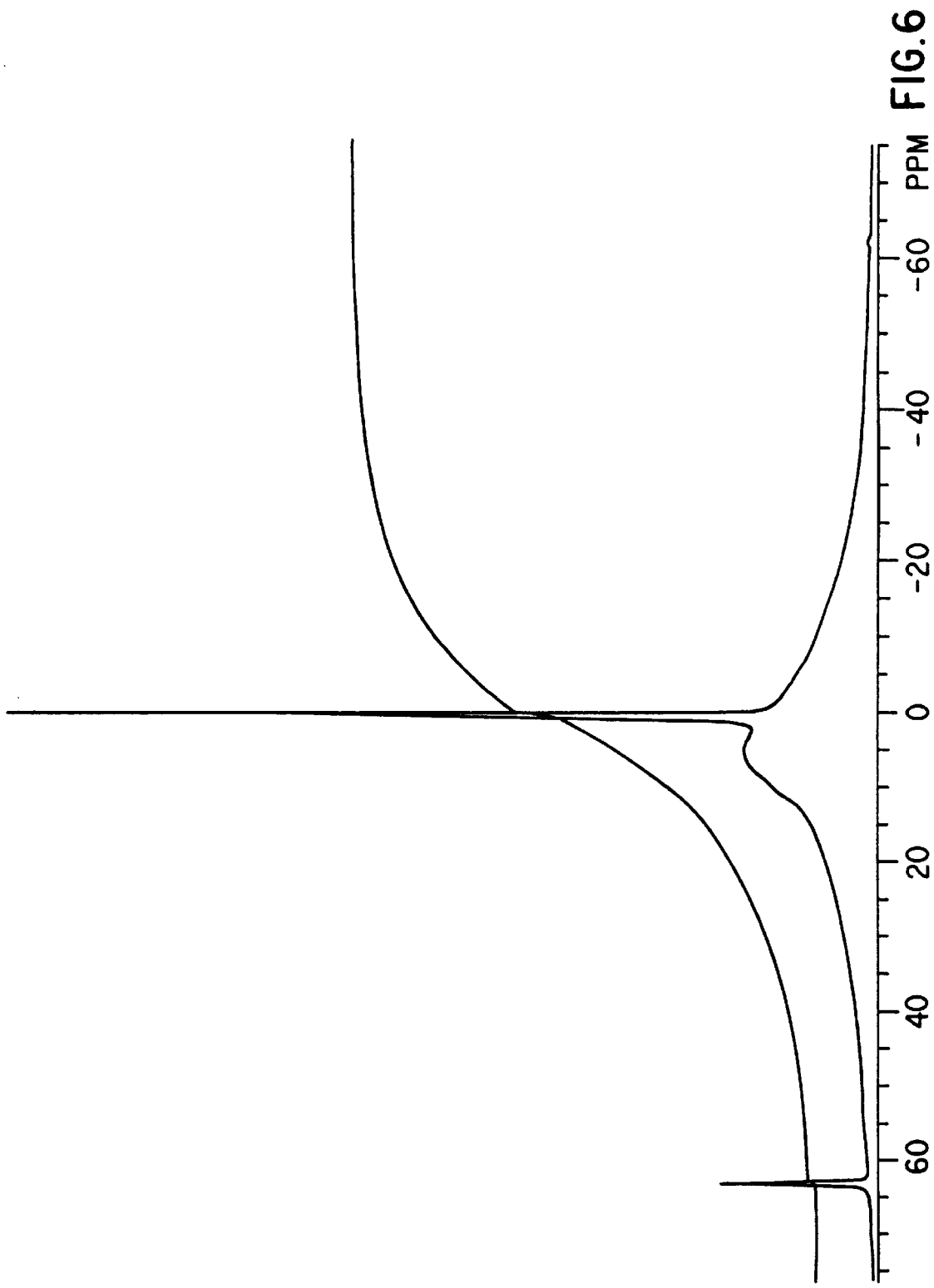
FIG. 6.
Figure 7:
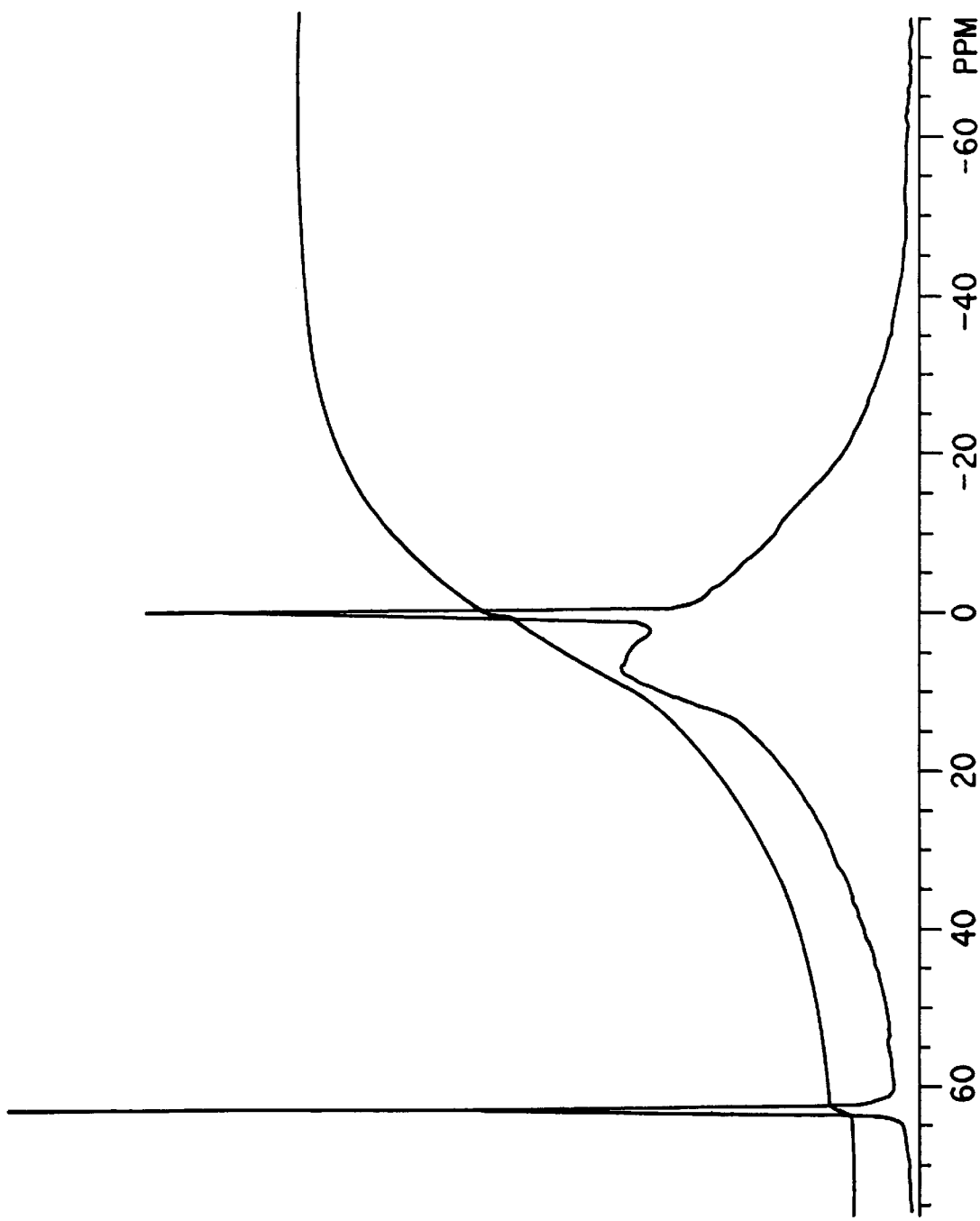
FIG. 7.
Figure 8:
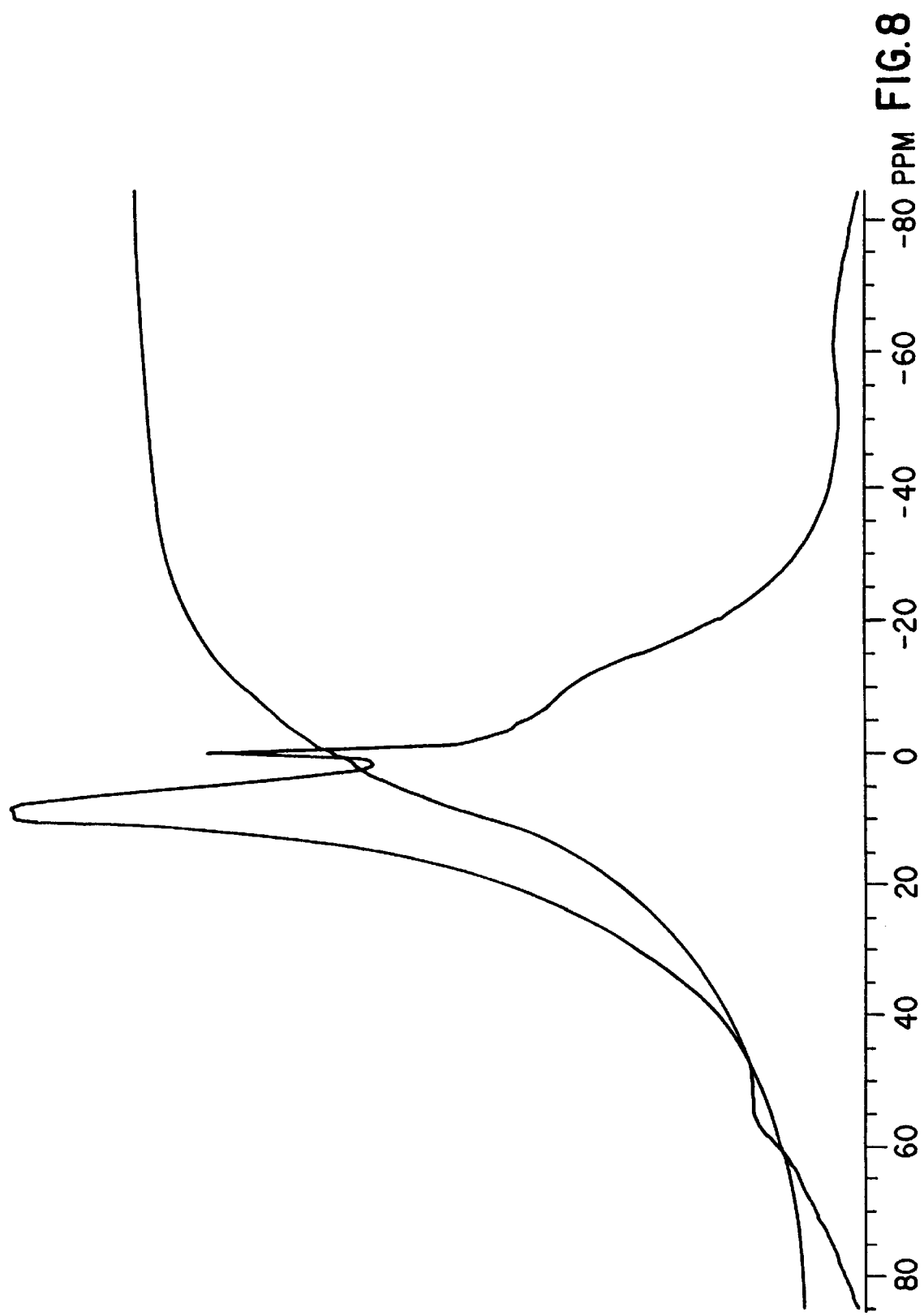
FIG. 8.

When preparations of high basicity were examined, dramatically altered results were observed. NMR spectra for the product of Example 9 (polyaluminum chloride: 10.5% aluminum oxide 83% basic) and for the product of Example 10 (polyaluminum chlorosulfate: 10.5% $Al_2O_3$, 80% basic, 0.2% $SO_4$) are shown in FIG. 6 and 7 respectively. These spectra show a clear peak at about 63 ppm, indicating the presence of an $Al_{13}$ polymeric species that is not present in any of the lower basicity products and which is also not present in commercially available aluminum chlorohydrate (Summit Chemical Co), FIG. 8. Thus, concentrated preparations of polyaluminum chloride and polyaluminum chlorosulfate made by the present process contain the specific aluminum species believed to be most efficient at removing impurities from water. Although it is thought that such species form in dilute solutions, they have not been found in concentrated (greater than 8% $Al_2O_3$), stable solutions of either polyaluminum chloride or polyaluminum chlorosulfate.

Example 13

Comparison of Flocculents

Polyaluminum chlorides and polyaluminum chlorosulfates made by methods disclosed herein were examined for their ability to serve as water purification agents and compared to commercially available preparations. Experiments were carried out using water from four different rivers and one lake. Jar testing evaluations were performed using the test method commonly used by the municipality from which the water was collected. Tests were performed using 1,000 ml of raw water in a Phipps & Bird Stirrer with products tested at equal aluminum oxide dosages. After performing the procedure dictated by the appropriate municipality, supernatants were evaluated for turbidity using a Hach turbidimeter. Turbidity results are shown in Table 1. The abbreviation "PAC" in the table stands for polyaluminum chloride and "PACS" stands for polyaluminum chlorosulfate. The percentages refer to percent basicity and flocculents prepared according to the present disclosure are identified by the specific examples describing their method of preparation. An examination of the results shown in the table indicates that the products made according to the methods disclosed herein are effective water purification agents. They outperformed the tested competitive products for every water sample examined.

TABLE 1

Turbidity Study

| | Monongahela River[1] | Potomac River[2] | Swimming River[3] | Delaware River[4] | Lake Erie[5] |
|---|---|---|---|---|---|
| Raw Water | 5.7 | 25 | 2.99 | 1.9 | 0.96 |
| 50% PACS (Example 6) | 1.2 | | 1.86 | | |
| 70% PACS (Example 7) | 0.2 | 4.4 | 0.86 | | 0.39 |
| 83% PAC (Example 9) | | | | 0.86 | 0.36 |
| 80% PACS (Example 10) | | | | 0.13 | 0.31 |
| Stern-PAC | 1.1 | | | | 0.42 |
| Ultra-Floc | | 7.6 | | | |
| Westwood 700S | | | 2.05 | | |
| Aluminum Chlorohydrate | | | | 1.39 | |

[1]Monongahela Study: 3.1 ppm $Al_2O_3$ for each flocculent; pH = 6.9; procedure: rapid mix for 1 minute at 100 rpm, floc-mix for 5 minutes at 60 rpm, floc-mix for minutes at 40 rpm, floc-mix for 5 minutes at 20 rpm.
[2]Potomac River Study: 5 ppm $Al_2O_3$ for each flocculent; pH = 7.8; procedure: rapid-mix for 30 seconds at 100 rpm, floc-mix 2 minutes at 50 rpm, floc-mix 2 minutes at 20 rpm, allow to settle 5 minutes.
[3]Swimming River Study: 1.4 ppm $Al_2O_3$ for each flocculent; pH = 6.9; Procedure: rapid-mix 15 seconds at 100 rpm, floc-mix 20 minutes at 20 rpm.
[4]Delaware River Study: 2.2 ppm $Al_2O_3$ for each flocculent; pH = 6.8; Procedure: rapid-mix 1 minute at 100 rpm, floc-mix for 30 seconds at 5 rpm.
[5]Lake Erie Study: 2 ppm $Al_2O_3$ for each flocculent; pH = 8.0; Procedure: rapid-mix for 1 minute at 100 rpm, floc-mix for 10 minutes at 30 rpm, allow to settle 10 minutes.

Example 14

Coagulation Using Blended Polyaluminum Chlorosulfate/Aluminum Sulfate 15 grams of the product of Example 7 was blended with 85 grams of liquid aluminum sulfate (8% aluminum oxide) and 5 grams of water. The resulting product was jar tested for its effectiveness as a coagulant and results were compared with coagulation performed with aluminum sulfate alone (8% aluminum oxide). It was found that the blended product only required about 50% of the dosage of aluminum sulfate to achieve the same turbidity as when the aluminum sulfate was used alone.

Example 15

Production of Basic Aluminum Chloride (Second Example)

2,557 kg of wet filtercake (61% $Al_2O_3$) is mixed with 8,549 kg of hydrochloric acid (32.7%), 160 kg of phosphoric acid (83.8%) and 1,731 kg of water. The mixture is allowed to react for 8 hours at a temperature of 110 degrees centigrade. This produces 12,793 kg of basic aluminum chloride (11.0% $Al_2O_3$, 9.8% basic). The basic aluminum chloride thus produced can be used in subsequent steps of the process disclosed herein to make a polyaluminum chloride of 12.0% $Al_2O_3$ and 33% basicity.

All references cited herein are fully incorporated by reference. Having now fully described the invention, it will be understood by those of skill in the art that the invention may be performed within a wide and equivalent range of conditions, parameters and the like, without affecting the spirit or scope of the invention or any embodiment thereof.

What is claimed is:

1. A process for producing polyaluminum chlorosulfate comprising:
    (a) mixing a first solution comprising sodium aluminate with a second solution comprising basic aluminum chlorosulfate wherein:
        (i) said mixing takes place under conditions of sufficiently high shear to prevent gel formation;
        (ii) the temperature of the mixture is maintained below 50 degrees centigrade; and
    (b) obtaining a clear product solution comprising said polyaluminum chlorosulfate.

2. The process of claim 1, wherein the clear product solution of step (b) is obtained by gradually increasing the temperature of the milky suspension produced in step (a) until a clear product solution comprising said polyaluminum chlorosulfate is obtained.

3. The process of claim 1, wherein the clear product solution of step (b) is obtained by allowing the milky suspension produced in step (a) to clear without applying additional heat.

4. The process of claim 1, wherein the temperature of said mixing in step a) is maintained at or below 40 degrees centigrade.

5. The process of claim 1, wherein said mixing takes place in the presence of a velocity gradient of at least 1000 reciprocal seconds.

6. The process of claim 1, wherein said second solution comprising basic aluminum chlorosulfate is made by reacting a source of aluminum oxide trihydrate with hydrochloric acid and sulfuric acid.

7. The process of claim 1, wherein calcium carbonate is added to said second solution comprising basic aluminum chlorosulfate before mixing with said first solution comprising sodium aluminate.

8. The process of claim 1, further comprising:
    (c) mixing a third solution comprising sodium aluminate with the polyaluminum chlorosulfate of step (b) to produce a second milky suspension wherein said mixing takes place under conditions of sufficiently high shear to prevent gel formation; and
    (d) obtaining a second clear product solution from said second milky suspension.

9. The process of claim 8, wherein said second clear product solution of step (d) is obtained by gradually increasing the temperature of said second milky suspension produced in step (c) until a clear product solution comprising said polyaluminum chlorosulfate is obtained.

10. The process of claim 8, wherein said second clear product solution of step (d) is obtained by allowing the suspension produced in step (a) to clear without applying additional heat.

11. The process of claim 8, wherein the temperature of said mixing in step a) is maintained at or below 40 degrees centigrade.

12. The process of claim 8, wherein said mixing in step a) and said mixing in step c) take place at in the presence of a velocity gradient of at least 1000 reciprocal seconds.

* * * * *